United States Patent Office 2,752,243
Patented June 26, 1956

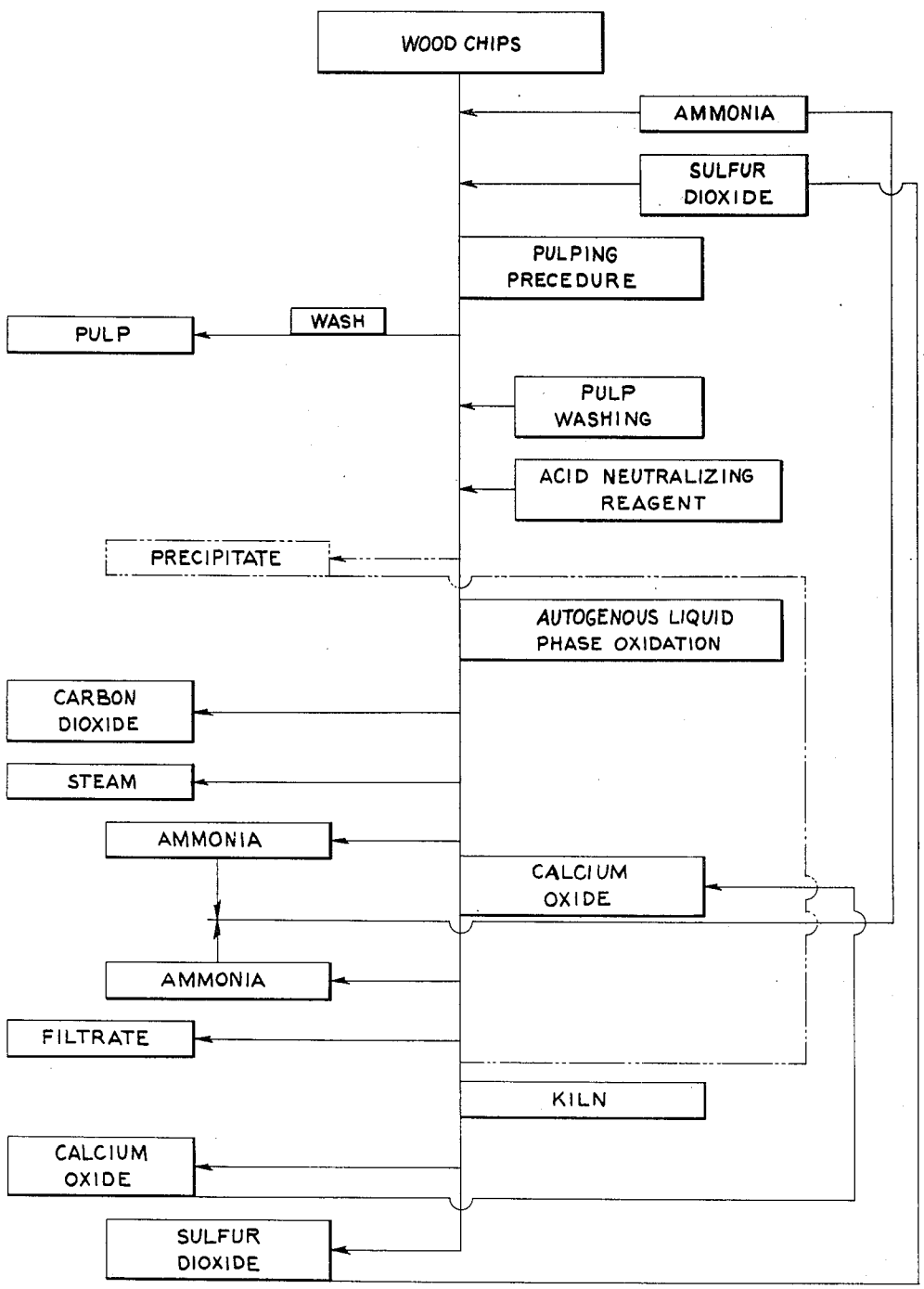

2,752,243
AMMONIA-SULFUR DIOXIDE COOKING ACID REGENERATION

Daniel M. Barton and Eugene W. Schoeffel, Kronenwetter, Wis., assignors to Sterling Drug Inc., New York, N. Y., a corporation of Delaware Application June 24, 1954, Serial No. 439,068

5 Claims. (Cl. 92—2)

This invention relates to the ammonia-sulfur dioxide method of producing pulp fiber from wood, and is more particularly concerned with such a process whereby the practical regeneration of ammonia-sulfur dioxide cooking liquor from the waste ammonia sulfite liquor which normally results from such a pulping procedure may be accomplished.

For the pulping of certain types of wood to obtain special types of paper and because of the ease of operation, many paper pulp manufacturers have given serious consideration to the use of ammonia-sulfur dioxide cooking liquors in preference to other cooking liquors. However, because of special inherent difficulties of such a procedure, including the high cost of the ammonia normally unrecoverably lost to a large degree after being used but once, air pollution, the highly obnoxious waste effluent requiring disposal, et cetera, ammonia-sulfur dioxide cooking liquor has not received wide use. The prior art methods generally used in treating waste sulfite liquors broadly included evaporation and burning of the organic material. This procedure cannot be applied to ammonia waste sulfite liquor, since such treatment merely results in the ammonia and part of the sulfur dioxide being converted to a gas and removed with the gaseous products of the combustion or evaporation. This is usually unrecoverably lost. Also, the air pollution presents serious objections.

It is, therefore, a principal object of the present invention to provide a complete process for the pulping of wood utilizing ammonia and sulfur dioxide wherein the ammonia and sulfur dioxide may be regenerated with little or no loss thereof. It is a further object of the present invention to provide such a process wherein substantially no air pollution results. Still a further object of the present invention is to provide a cyclic process wherein an appropriate cooking liquor, pulp, and an aqueous waste effluent having a very small biological oxygen demand are the only products removed. Still a further object of the present invention is to provide a process for the regeneration of ammonia and sulfur dioxide from ammonium sulfite liquor. Other objects will be come apparent hereinafter.

The foregoing and additional objects have been accomplished by the provision of a process which has been diagramed in the accompanying drawing. This drawing is a flow sheet of the generic aspects of the present invention.

Referring to the drawing:

Processed wood chips are digested with ammonia and sulfur dioxide, the pulp separated, and the separated ammonium sulfite liquor treated with an acid neutralizing agent. This neutralized mixture is then oxidized in the liquid phase and the gases separated therefrom. The non-condensable gases are treated to separate the ammonia, the remainder vented, the condensables collected, combined with the liquid effluent, treated with an alkaline earth hydroxide, and the ammonia gas formed thereby collected. This ammonia gas can be used for the cooking liquor. The precipitate which is formed can be kilned and the sulfur dioxide thus formed collected and used for the cooking liquor. It will thus be seen that the only discarded products from the whole cyclic procedure are the desirable pulp, steam, which being condensed, is substantially pure, a substantially water pure filtrate, and carbon dioxide, which may be safely vented. Pollution of the air and water are eliminated by the procedure and substantially complete recovery of the cooking liquor is accomplished. Additionally, the process requires a minimum of mechanical handling of the materials as well as little treatment beyond that which prior art techniques used for the prevention of pollution.

The first step of the present invention contemplates that wood chips will be provided in the usual manner. Pulping of the wood chips is accomplished in conventional manner with a combination of ammonia and an excess of sulfur dioxide, which combine together in aqueous solution to form ammonium bisulfite. After digestion, the pulp is separated from the ammonium sulfite liquor, and the pulp washings combined therewith. The pulp may be further processed to prepare paper or other fibrous materials.

The combined ammonium sulfite liquor and pulp washings are then treated with an acid neutralizing agent. Preferably, calcium hydroxide is employed, because of the availability, economically advantageous factors, and the fact that the kilning step provides calcium oxide as a product. However, other acid neutralizing agents, such as sodium hydroxide, sodium carbonate, calcium carbonate, barium carbonate, the bicarbonates of the foregoing alkali materials and other acid neutralizing agents can be used. Desirably, an acid neutralizing agent is employed which will form a non-volatile salt derivative. Alternatively, if the volatile salt formed is readily separable from the carbon dioxide in steam produced by the following procedure, volatile salt forming materials may be employed. Because of the high temperatures and high pressure utilized in the autogenous oxidation phase of the procedure of the present invention, it is not desirable to have large quantities of acid present, due to corrosion of equipment and difficulty of handling. Therefore, the amount of alkaline material used will be that which will reduce the pH to about 9 or slightly below, such as 7.5. Where the acid neutralizing material used forms a precipitate, this precipitate is separated and kilned as hereinafter discussed.

The neutralized ammonium sulfite liquor and pulp washings are next introduced into an autogenous liquid phase reactor. In substantially completely oxidizing the ammonium sulfite liquor, the necessary apparatus comprises a pump for continuously charging the reactor with spent pulp liquor, an air compressor, a reactor provided with means to remove periodically any precipitate formed therein, and a flash chamber to receive the oxidized residual spent liquor from the reactor.

In initiating the oxidation phase, the spent pulp liquor is pumped into the reactor under a pressure up to about 200 to 2000 pounds per square inch, the preferred pressure being that which is sufficient to maintain substantially all of the ammonium sulfite liquor in the liquid phase. The waste liquor charge is then heated by means of an oil ring to a temperature between about 100 or 150 degrees and 372 degrees centigrade, temperatures of from 235 to 250 or 300 degrees centigrade being useful for the solids recovery. Compressed air, or other compressed gaseous material capable of furnishing free oxygen under a pressure slightly greater than the pressure in the reaction zone is then introduced into the reactor containing the ammonium sulfite liquor through a dispersion head to initiate the oxidation of the combustible materials. The rate of charge in the reactor with spent ammonium sulfite liquor and the rate of introduction of compressed air or other oxidation media is synchronized to assure that substantially complete oxidation of all the inorganic and organic constituents occurs. Once initiated, the oxidation procedure proceeds exothermically so that no external heat is required and, in fact, the spent pulp liquor can be introduced into the reactor at a temperature of as low as twenty degrees centigrade, the exothermic heat liberated from the oxidation being sufficient to raise the temperature of the carbonaceous material in the incoming spent liquor to a point where substantially complete oxidation will ensue. The quantity of oxidizing agent supplied is preferably that theoretically required to convert all the organic combustible material to its own end product, namely, carbon dioxide, and water, and in general, sufficient oxygen to produce substantially complete oxidation of all other oxidizable material in the ammonium sulfite liquor should be employed in the oxidation reactor. With proper control of this oxidation procedure, it is possible to produce more heat than is required for oxidation and the excess heat thus-produced can be used suitably throughout the plant.

The oxidized effluent from the reactor is then continuously passed through a flash chamber from which the fixed gases, i. e., nitrogen, carbon dioxide, and excess air are vented off with steam under pressure. Any ammonia which is present is separated by the usual methods for separation of ammonia from other gases, as by adsorption in water, et cetera. The liquid effluent is then removed from the reactor.

The liquid effluent (ammonium-containing concentrate) from the flash chamber contains primarily ammonia, ammonium bicarbonate, ammonium carbonate, and a certain amount of ammonium acetate and other materials.

The non-condensable gases which are collected from the reactor are passed through suitable heat exchange elements whereby the heat contained therein may be converted to useful heat for use throughout the plant. This heat may also be used to preheat the ammonium sulfite liquor introduced into the autogenous liquid phase oxidation reactor with the result that the amount of heat available from the reactor is sufficient to not only operate the procedure of the present invention, but also to provide excess heat which may be adequately utilized throughout the plant. The non-condensable materials which are separated from the reactor after passing through the heat exchanger and being cooled down to a reasonable temperature, is treated so as to remove the carbon dioxide from the ammonia, as by treatment with calcium oxide which reacts with the ammonium bicarbonate present to yield calcium carbonate as a precipitate and ammonia as a gas. This ammonia is collected and utilized in a subsequent treatment of more wood chips, and thus forms a part of a cyclic procedure.

Generally, the ammonia collected here is combined with the ammonia vented from the reactor, and stored until needed, or led directly into contact with the additional wood chips. The calcium sulfate, which is separated from the reaction procedure, can be combined with the precipitate formed previously and is then heated at a temperature of about 1530 degrees centigrade, whereby calcium oxide and sulfur dioxide are formed. The sulfur dioxide is then contacted with the wood chips in combination with the ammonia to give a second phase of reaction herein, and to complete the cycle, while the calcium oxide may be reused in an earlier step.

Carbon dioxide and steam which are formed in the oxidation procedure may be vented to the air or the steam condensed in suitable heat exchange equipment to form water which may be then discarded and carbon dioxide which may be vented. This water will be found to contain substantially no biological oxygen demand when condensed, and in fact, in the procedures which have been utilized in laboratory and pilot plant scale, have indicated that the water which is returned to a typical northern river is purer than that water which has been taken from it and used in the process.

The following examples are given to illustrate the procedure of the present invention but are not to be construed as limiting the invention thereto.

*Example 1*

Wood chips were processed in the conventional manner, using an aqueous mixture of ammonia and an excess of sulfur dioxide, the pulp separated, washed and the washings and ammonium sulfite liquor combined. This procedure yielded a liquor containing 2.9 grams per liter of free ammonia, 2.95 grams per liter total ammonia, 36.1 grams per liter of carbon, 5.8 grams per liter of sulfur, and having an oxygen demand of 115 grams per liter. This liquor is treated with calcium oxide, as the acid neutralizing reagent, in amount to give a pH of approximately 8.5 with the result that 24.7 grams per liter of calcium sulfate equivalent was precipitated from the mixture. This calcium sulfate was removed by filtration. The filtrate was theated at 294 degrees centigrade under 1950 pounds per square inch pressure in the presence of an excess of sufficient oxygen as air theoretically to convert all the carbon to carbon dioxide, all the hydrogen to steam, and the inorganic salts to their highest state of oxidation.

The precipitate in the reactor contained 10.6 percent carbon dioxide, 15.2 percent sulfur and 45.6 percent calcium calculated as calcium oxide and amounted to 28.5 grams per liter on a dry basis. This precipitate has no biological oxygen demand and contained about 0.2 percent ammonia. The liquid and gaseous effluent was led to a flash chamber where the condensables were separated from the non-condensables, and the non-condensable portion containing nitrogen, carbon dioxide and ammonia found to contain 1.92 grams per liter of ammonia. This ammonia was separated from the other gases by absorption in water and set aside. The nitrogen and carbon dioxide were vented to the air. Calcium hydroxide in an amount sufficient to liberate all the ammonia was added with stirring to the condensed effluent at 75 degrees centigrade. The liberated ammonia was dissolved in water and combined with the previously collected liquid. The calcium sulfate and carbonate mixture which precipitated was collected by filtration, combined with the prior precipitated calcium sulfate from the reactor, and kilned at 1530 degrees centigrade to cause the formation of carbon dioxide and sulfur dioxide. These gases were collected in the ammonia-water above-prepared, and the excess carbon dioxide vented and the resulting liquor was suitable for an ammonia-sulfur dioxide cooking liquor.

*Example 2*

An ammonia-sulfite waste liquor similar to that of Example 1 and containing 1850 grams total ammonia was raised to a pH of 8 with calcium hydroxide in water, and oxidized in the manner of Example 1. It was then determined that 1200 grams (65 percent) of ammonia was contained in the flash condensate. Three hundred fifty-six (19.2 percent) remained in the reactor as residue (sludge) and 294 grams (15.8 percent) was present in the non-condensable (volatile) portion from the reactor. Thus, it may be seen that only ammonia which is lost includes that which is not absorbed in the absorption procedures, but none need be lost in the oxidation procedure, in contrast to prior art techniques. Other neutralizing agents can be substituted for the calcium hydroxide of the foregoing example, such as, for example, sodium hydroxide, sodium carbonate, calcium carbonate, potassium hydroxide, et cetera.

*Example 3*

The procedure of Example 2 was repeated except that ammonia was used as the acid neutralizing agent instead of the calcium hydroxide. The total ammonia input was 3280 grams of ammonia and after oxidation, at 2240 grams (68.3 percent) of ammonia in the reactor residue (sludge), 995 grams (30.3 percent) in the flash condensate, and 45 grams (1.4 percent) in the non-condensable portion.

Various modifications may be made in the method of the present invention without departing from the spirit or scope thereof, and it is to be understood that we limit ourselves only as defined in the appended claims.

We claim:

1. The process which includes: pulping wood chips with an ammonia-sulfur dioxide cooking liquor; separating a waste ammonia sulfite liquor; neutralizing said waste liquor with an acid neutralizing agent to a pH of at least 7.5; heating this neutralized liquor at a temperature above 150 degrees centigrade and under at least 200 pounds per square inch pressure in the presence of at least enough oxygen to convert all the carbon to carbon dioxide and all the hydrogen to steam; collecting the ammonia from the liquid effluent by treatment with an alkaline earth hydroxide; separating the alkaline earth precipitate thus-formed; and, treating additional wood chips with the collected ammonia.

2. The process which includes: pulping wood chips with an ammonia-sulfur dioxide cooking liquor; separating a waste ammonia sulfite liquor; neutralizing said waste liquor with an acid neutralizing agent to a pH of at least 7.5; heating this neutralized liquor at a temperature above 150 degrees centirgrade and under at least 200 pounds per square inch pressure in the presence of at least enough oxygen to convert all the carbon to carbon dioxide and all the hydrogen to steam; collecting the ammonia from the liquid effluent by treatment with an alkaline earth hydroxide; separating and kilning the alkaline earth precipitate thus-formed, to prepare an alkaline earth oxide and sulfur dioxide; and, treating additional wood chips with the collected ammonia and sulfur dioxide resulting from the kilning.

3. The process which includes: pulping wood chips with an ammonia-sulfur dioxide cooking liquor; separating a waste ammonia sulfite liquor; neutralizing said waste liquor with an aqueous slurry of calcium oxide; heating the neutralized liquor at a temperature above 150 degrees centigrade and under at least 200 pounds per square inch pressure in the presence of at least enough oxygen to convert all the carbon to carbon dioxide and all the hydrogen to steam; collecting the ammonia from the liquid effluent by treatment with calcium oxide; separating and kilning the calcium precipitate thus-formed, to prepare calcium oxide and sulfur dioxide; and treating additional wood chips with the collected ammonia and sulfur dioxide resulting from the kilning.

4. The process of claim 3, wherein the kilning is accomplished at approximately 1530 degrees centigrade.

5. The cyclic process which includes: pulping wood chips with an ammonia-sulfur dioxide cooking liquor; separating a waste ammonia sulfite liquor; treating said waste liquor with calcium oxide to obtain a pH between about 7.5 and 9.0; separating the precipitate (A); heating this treated liquor to a temperature between 235 and 250 degrees centigrade under the autogenous pressure of the reaction mixture and in the presence of at least sufficient oxygen, as air, theoretically to convert all the carbon to carbon dioxide and all the hydrogen to steam; separating the condensables from the non-condensables and collecting the ammonia from the non-condensables; treating the condensables with sufficient calcium oxide to cause evolution of substantially all of the ammonia; separating the precipitate (B) and combining precipitates (A) and (B); heating the combined precipitates to about 1530 degrees centigrade to prepare sulfur dioxide and calcium oxide; using the ammonia and sulfur dioxide to treat subsequent wood chips; and using the calcium oxide to treat subsequent waste ammonia sulfite liquor.

References Cited in the file of this patent

UNITED STATES PATENTS

| Re. 4,203 | Eaton | Dec. 20, 1870 |
| 53,839 | Lehman | Apr. 10, 1866 |
| 1,795,557 | Hagglund | Mar. 10, 1931 |
| 1,891,337 | Seaman | Dec. 20, 1932 |
| 1,926,002 | Halin et al. | Sept. 5, 1933 |
| 2,516,827 | Marshall et al. | July 25, 1950 |
| 2,686,120 | Marshall et al. | Aug. 10, 1954 |

OTHER REFERENCES

Pulp and Paper Manufacture, vol. L, pp. 346 347, 403, 404. Pub. by McGraw-Hill, New York (1950). (Copy in Sci. Lib.)